(12) United States Patent
Sugiyama

(10) Patent No.: US 8,678,279 B2
(45) Date of Patent: Mar. 25, 2014

(54) COMMUNICATION DEVICE SYSTEM AND CARD-TYPE DEVICE

(75) Inventor: Michiyuki Sugiyama, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 814 days.

(21) Appl. No.: 12/634,929

(22) Filed: Dec. 10, 2009

(65) Prior Publication Data

US 2010/0230489 A1   Sep. 16, 2010

(30) Foreign Application Priority Data

Mar. 10, 2009  (JP) ................................. 2009-056001

(51) Int. Cl.
*G06K 5/00* (2006.01)

(52) U.S. Cl.
USPC ............ 235/382; 235/375; 235/379; 235/380; 235/383

(58) Field of Classification Search
USPC ............................ 235/375, 379, 380, 382, 383
See application file for complete search history.

(56) References Cited

U.S. PATENT DOCUMENTS

| 7,103,575 B1* | 9/2006 | Linehan | 705/64 |
| 2003/0009382 A1* | 1/2003 | D'Arbeloff et al. | 705/17 |
| 2004/0181463 A1* | 9/2004 | Goldthwaite et al. | 705/26 |
| 2006/0049256 A1* | 3/2006 | von Mueller et al. | 235/449 |
| 2007/0170245 A1* | 7/2007 | Elbaum et al. | 235/380 |
| 2007/0276765 A1* | 11/2007 | Hazel et al. | 705/71 |
| 2008/0091617 A1* | 4/2008 | Hazel et al. | 705/73 |
| 2008/0183629 A1* | 7/2008 | Kausik | 705/71 |

FOREIGN PATENT DOCUMENTS

JP    2003-141689    5/2003

* cited by examiner

*Primary Examiner* — Ali Sharifzada

(74) *Attorney, Agent, or Firm* — Antonelli, Terry, Stout & Kraus, LLP.

(57) ABSTRACT

There is provided a communication device system and a card-type device, in which an attachable and detachable communication device can be attached later only when a control, maintenance or monitor function and an authentication function are required. A communication function, a function to convert an electric signal of a control object device into another communication protocol, and an encryption/decryption function are concentrated on one card, and this card is obtained only when necessary, and the control, maintenance or monitor can be performed remotely. The card is created by an appropriate certificate authority or a manufacture maker of the control object device, and necessary information can be set.

10 Claims, 17 Drawing Sheets

COMMUNICATION DEVICE SYSTEM AND CARD-TYPE DEVICE

CLAIM OF PRIORITY

The present application claims priority from Japanese patent application JP 2009-056001 filed on Mar. 10, 2009, the content of which is hereby incorporated by reference into this application.

BACKGROUND OF THE INVENTION

1. Field of the Invention

The present invention relates to a communication device system and a card-type device, and particularly to a communication device system having an authentication function of a device which is subjected to remote control, remote maintenance and/or remote monitor, and a card-type device used in the system.

2. Description of the Related Art

In a related art technique, a device which is subjected to remote control, maintenance or monitor has an authentication function by itself, and it is necessary to provide the authentication function also in a device which is not required to be subjected to the remote control, maintenance or monitor.

For example, JP-A-2003-141689 discloses that since a car stop can not be released unless a specified authentication process from a portable terminal is performed, the security in a parking lot is improved, and car theft can be effectively prevented.

A device which is required to be subjected to remote control, remote maintenance or remote monitor has generally a device authentication function by itself, and even when the remote control, maintenance or monitor is not required, the authentication function is installed as a redundant function, or another device is required to be formed. Besides, the control, maintenance or monitor information varies for each object device, and it is necessary to specially cope with the device authentication function on the side where communication with the object device is performed.

Besides, when a control object device such as a home electric appliance is subjected to remote maintenance control or remote monitor, it is necessary that the control object device has a protocol for performing control, maintenance or monitor, an encryption function and a communication function.

As described above, the related art suffers from following problems.

(1) Since the remote control/maintenance/monitor function, the authentication function or the like is set for a device which does not necessarily require the remote control, the cost in development and manufacture is increased.

(2) Even if a protocol for remote control is created or a general protocol is used, many protocols such as Echonet, UPnP and DLNA are conceivable, and an HGW side function corresponding to this is required.

(3) It is difficult for a remote control service providing side to authenticate whether a product is a guaranteed product.

(4) There is a fear that an encryption key is generated and managed by a third party.

SUMMARY OF THE INVENTION

In view of the above circumstances, it is an object of the invention to provide a communication device system and a card-type device to which an attachable and detachable communication device can be later attached only when a control, maintenance or monitor function and an authentication function are required.

Besides, it is another object of the invention to provide a communication device system and a card-type device that perform device authentication by performing ID authentication with an object device to which the communication device system is connected, and can indicate to a service providing side that the device is the device guaranteed by an ID of an certificate authority connected to a device ID.

Besides, it is another object of the invention to provide a communication device system and a card-type device, which has a function to convert control, maintenance or monitor information unique to each device into standard control, maintenance or monitor information, and a common process can be basically performed on the side where communication is performed with an object device.

Further, it is another object of the invention to eliminate waste in manufacture of an object device and to reduce the cost by using an attachable and detachable card having a control, maintenance or monitor function and an authentication function in a communication device system and by connecting it to a home electric appliance or various control object devices only when necessary.

In the invention, especially, a communication function, a function to convert an electric signal of a control object device into another communication protocol, and an encryption and decryption function are concentrated on one card, and this card is obtained only when necessary, and remote control, maintenance or monitor can be performed. The card is created by an appropriate certificate authority or a manufacture maker of the control object device, and necessary information can be set.

According to the first solving means of the invention, there is provided a communication device system in which a card-type device is inserted into or connected to a control object device, the card-type device and a gateway are connected by a wireless or wired network, device authentication of the control object device is performed, and a maintenance control or remote monitor apparatus connected to the gateway performs remote maintenance control or remote monitor of the control object device, wherein the card-type device comprises:

a connection section to be connected to a card slot of the control object device or another device by a pin or a contact;

a communication section to connect with the wireless or wired network;

a card storage section to store a previously determined card ID, a previously determined certificate authority address, a device authentication ID, and a device ID;

an information conversion section to perform protocol conversion or another conversion process between a signal used in the control object device and remote maintenance control information or remote monitor information used in the maintenance control or remote monitor apparatus connected to the gateway in accordance with a set information conversion module; and an encryption/decryption section which encrypts information from the information conversion section based on an encryption key stored in a storage section, and sends it by the communication section, and while, which decrypts information from the communication section based on the encryption key, and sends it to the information conversion section, wherein the card-type device stores the card ID and the certificate authority address in the card storage section, the card-type device stores the device authentication ID, the device ID and the encryption key in the card storage section by the gateway, and sets the information conversion module in the information conversion section by the gateway, when the card-type device is inserted into or connected to the control object device through the connection section, the card-type device establishes session to the gateway through the network by the communication section in accordance with the certificate authority address stored in the card storage section, the card-type device acquires a device ID from the control object device through the connection section, the card-type device compares the device ID acquired from the control object device through the connection section with the device ID stored in the card storage section, when both the device IDs coincide with each other, the card-type device encrypts the device authentication ID stored in the card storage section by the encryption/decryption section in accordance with the encryption key, transmits it to the gateway through the network by the communication section, and executes device authentication by the gateway, after the gateway completes the device authentication, (1) the card-type device performs the protocol conversion or another conversion process between the electric signal of the control object device and the information of the gateway side device for information electric home appliance or for remote maintenance control or for remote monitor by the information conversion section in accordance with the information conversion module, and (2) i) the card-type device decrypts the information sent from the gateway based on the encryption key stored in the card storage section by the encryption/decryption section and sends it to the information conversion section, and/or ii) the card-type device encrypts the information sent from the information conversion section based on the encryption key stored in the card storage section, sends it to the gateway through the network by the communication section, and (3) the card-type device performs the remote maintenance control or remote monitor between the gateway and the control object device.

According to the second solving means of the invention, there is provided a card-type device in a communication device system in which a card-type device is inserted into or connected to a control object device, the card-type device and a gateway are connected by a wireless or wired network, device authentication of the control object device is performed, and a maintenance control or remote monitor apparatus connected to the gateway performs remote maintenance control or remote monitor of the control object device, the card-type device comprising:

a connection section to be connected to a card slot of the control object device or another device by a pin or a contact;

a communication section to connect with the wireless or wired network;

a card storage section to store a previously determined card ID, a previously determined certificate authority address, a device authentication ID, and a device ID;

an information conversion section to perform protocol conversion or another conversion process between a signal used in the control object device and remote maintenance control information or remote monitor information used in the maintenance control or remote monitor apparatus connected to the gateway in accordance with a set information conversion module; and an encryption/decryption section which encrypts information from the information conversion section based on an encryption key stored in a storage section, and sends it by the communication section, and while, which decrypts information from the communication section based on the encryption key, and sends it to the information conversion section, wherein the card-type device stores the card ID and the certificate authority address in the card storage section, stores the device authentication ID, the device ID and the encryption key in the card storage section by the gateway, and sets the information conversion module in the information conversion section by the gateway, when the card-type device is inserted into or connected to the control object device through the connection section, the card-type device establishes session to the gateway through the network by the communication section in accordance with the certificate authority address stored in the card storage section, the card-type device acquires a device ID from the control object device through the connection section, the card-type device compares the device ID acquired from the control object device through the connection section with the device ID stored in the card storage section, when both the device IDs coincide with each other, the card-type device encrypts the device authentication ID stored in the card storage section by the encryption/decryption section in accordance with the encryption key, transmits it to the gateway through the network by the communication section, and executes device authentication by the gateway, after the gateway completes the device authentication, (1) the card-type device performs the protocol conversion or another conversion process between the electric signal of the control object device and the information of the gateway side device for information electric home appliance or for remote maintenance control or for remote monitor by the information conversion section in accordance with the information conversion module, and (2) i) the card-type device decrypts the information sent from the gateway based on the encryption key stored in the card storage section by the encryption/decryption section and sends it to the information conversion section, and/or ii) the card-type device encrypts the information sent from the information conversion section based on the encryption key stored in the card storage section, sends it to the gateway through the network by the communication section, and (3) the card-type device performs the remote maintenance control or remote monitor between the gateway and the control object device.

According to the invention, the following effects are obtained.

(1) Since the card on which the communication function, the encryption/decryption function, and the protocol conversion function are concentrated is inserted only in a device requiring remote control, the cost of the object device main body can be reduced.

(2) Since the specification is made such that the protocol conversion function can be added later and can be changed for each object device, it can be formed and used in accordance with the circumstances on the HGW side or the like.

(3) The manufacture maker of the device or the certificate authority typifying that sets the type of the device, the manufacture number or the like in the card, and the authentication between the card and the device becomes possible by confirming it for the control object device. Besides, the authentication between the maker or the certificate authority and the card, and the authentication of the device become possible by the device authentication ID set in the card.

(4) Since an encryption key is generated in the inside of an HGW installed in each home or office by a random number for each card, leakage to the outside is hard to occur. Even if the leakage occurs, the damage can be reduced.

DETAILED DESCRIPTION OF THE INVENTION

1. Card-Type Device (Hardware)

Figure 1:
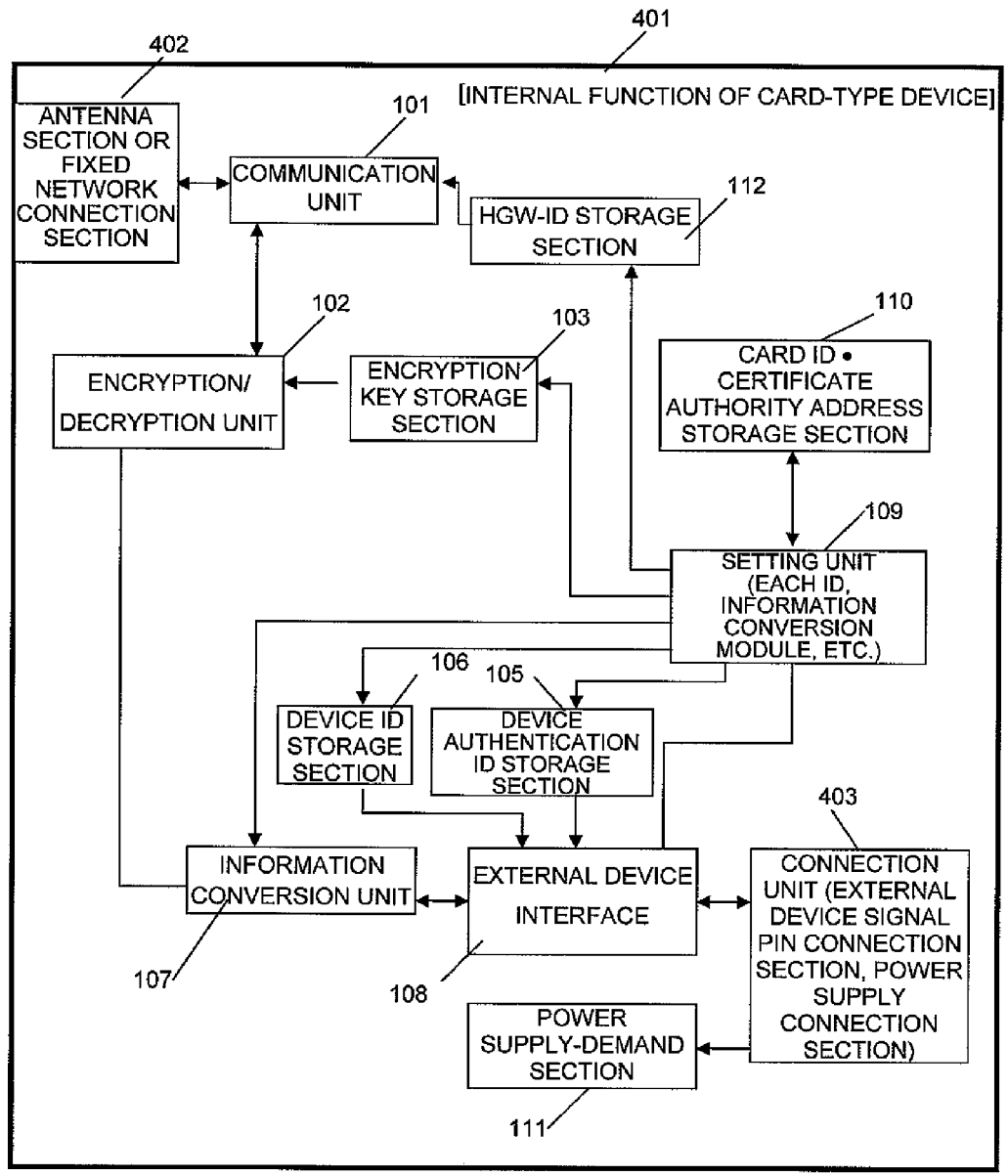
FIG. 1 is a structural view of internal functions of a card-type device.

FIG. 1 is a structural view of internal functions of a card-type device.

A card-type device 401 includes, for example, a communication unit 101, an encryption/decryption unit 102, an encryption key storage section 103, a device authentication ID storage section 105, a device ID storage section 106, an information conversion unit 107, an external device interface 108, a setting unit 109, a card ID ● certificate authority address storage section 110, a power supply-demand section 111, an HGW-ID storage section 112, an antenna section or fixed network connection section 402, and a connection unit 403. Incidentally, in the invention, the card-type device 401 includes a card-type device which can be attached to and detached from a communication device system and can have various shapes, such as a chip shape, a block shape and a sheet shape, in addition to a so-called card shape (hereinafter, in the same cases, the "card-type device" can be simply called the "card").

The communication unit 101 is a portion to transmit device control information or device operating state information through Zigbee, Bluetooth, wireless Local Area Network (LAN), wired LAN, or Power Line Communications (PLC), or to receive instruction information from the LAN side. The encryption/decryption unit 102 is a function to encrypt or decrypt transmission and reception data based on a common key (encryption key) set in the encryption key storage section 103. The information conversion unit 107 is a portion to perform protocol conversion between an HGW and a control object device when the Home Gateway (HGW) transmits and receives information to and from the control object device. The connection unit 403 includes an external device signal pin connection section, and a power supply connection section. The external device interface 108 is a portion to transmit and receive an electric signal to and from the control object device, the HGW or a server device of a certificate authority through the connection unit 403. When the card-type device is connected to the certificate authority server or the HGW, the setting unit 109 receives a card ID, a device ID, a device authentication ID, an information conversion module (conversion process program of protocol conversion between the HGW and the control object device, or information conversion, etc.) a common key (encryption key) and an HGW-ID, and sets them in the respective setting areas. The power supply-demand section 111 is a portion to receive electric power from the outside through the connection unit 403.

2. Outline of the Operation

In the basic form of the communication device system of the embodiment, an organization (see FIG. 8) to guarantee a control object device sets a unique code specific to a card, which is called "card ID", is to be stored in the card ID ● certificate authority address storage section 110, and uniquely connects the control object device to the card, and an address of the system to perform the guarantee of the organization through a network. The card in which the card ID is set is sent to a card user, and the user inserts the card into a slot of a home server 901 (see FIG. 9) such as the HGW of the user home. Information is transmitted and received between the home server 901 such as the HGW and the card, and as a result, a device ID such as a manufacture number of the control object device, a device authentication ID, an information conversion module for converting a communication protocol between the HGW and the control object device, and a common key (encryption key) specific to each home HGW are set on the card (see FIG. 13). Thereafter, the card is set in a control object device such as an air conditioner, so that device authentication is performed, and there occurs a state where remote control can be performed (see FIG. 10). Incidentally, the common key (encryption key) can be appropriately set for each HGW, and/or each control object device, and/or each card.

Hereinafter, the respective operations will be described.

Figure 8:
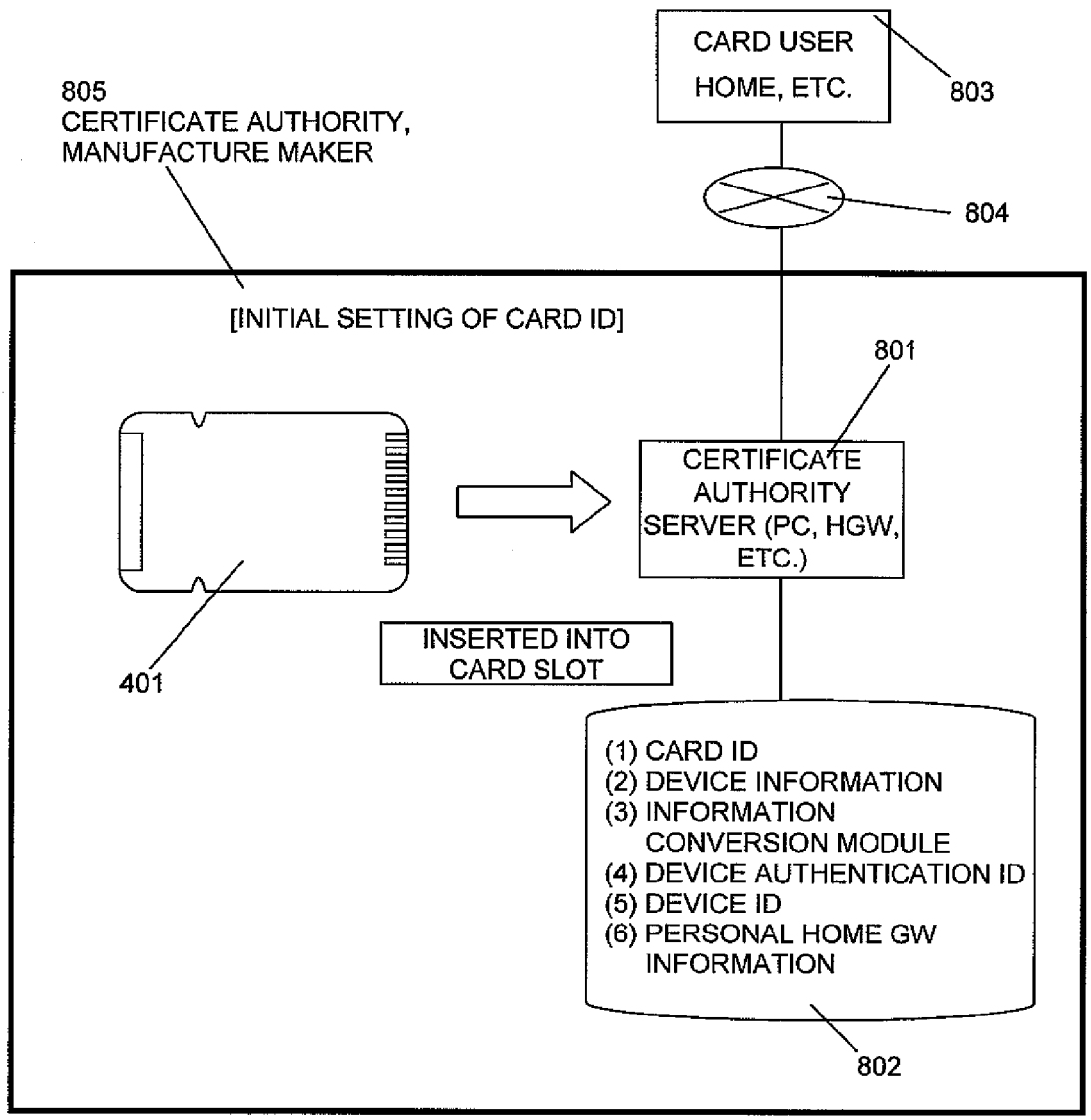
FIG. 8 is an explanatory view of setting (certificate authority, manufacture maker, etc.) of a card ID.

FIG. 8 is an explanatory view of setting (certificate authority, manufacture maker, etc.) of the card ID. This figure shows initial setting of the card ID and the certificate authority address by the certificate authority or the like. The details will be described later with reference to FIG. 12 and FIG. 15.

In general, the respective information of the encryption key storage section 103, the device authentication ID storage section 105, the device ID storage section 106, the information conversion unit 107, the card ID ● certificate authority address storage section 110 and the HGW-ID storage section 112 are not set in the card 401 immediately after manufacture. Then, first, an organization 805 which can certify the control object device and the card 401, such as the certificate authority or the manufacture maker of the control object device, sets the card ID and the certificate authority address in the card ID ● certificate authority address storage section 110 (see FIG. 12 described later). Besides, the communication unit 101, the encryption/decryption unit 102, the external device interface 108 and the setting unit 109 are incorporated at, for example, the time of the card manufacture or are software set by the certificate authority or the device manufacture maker 805.

Figure 9:
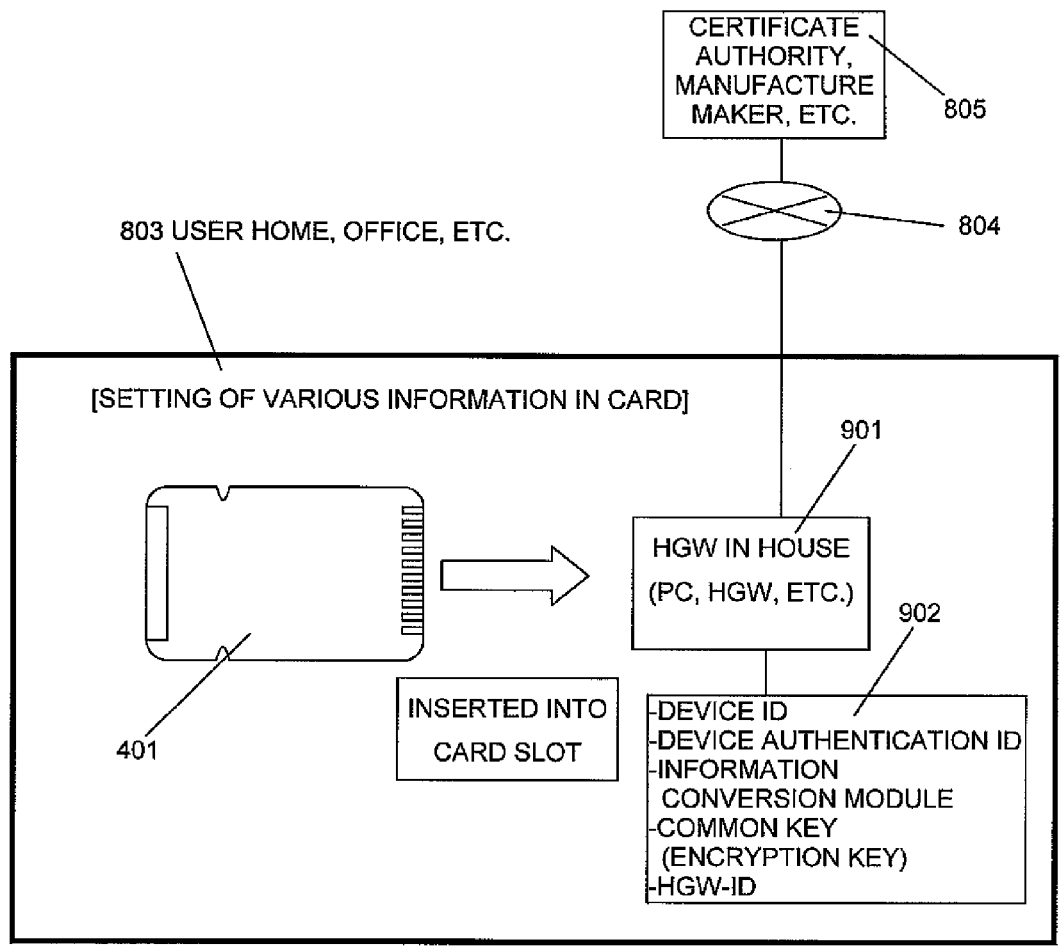
FIG. 9 is an explanatory view of setting (user home, office, etc.) in a card.

FIG. 9 is an explanatory view of setting (user home, office, etc.) of various information in the card. This figure shows an example in which various information is set in the card, which is sent from the certificate authority or the like and in which the card ID is already set, by the HGW installed in the user home, factory, office or the like. The details will be described later with reference to FIG. 9, FIG. 16 and FIG. 17.

When the card ID and the like are set, the card 401 is sent to a requester who requests the card 401. The requester connects this card in a card socket of the HGW 901 to communicate with the control object device. The HGW 901 recognizes that the card 401 is connected to the card socket, and connects to the certificate authority (manufacture maker, etc.) 805 based on the certificate authority address of the card ID ● certificate authority address storage section 110 set on the card 401. At this time, similarly, the card ID information set in the card ID ● certificate authority address storage section 110 is sent to the certificate authority 805. The certificate authority (manufacture maker, etc.) 805, which receives the connection request, causes the HGW 901 of the connection request source 803 to download the device ID, the device authentication ID, the information conversion module (program, data, etc.), which are connected to the card ID information. For example, the HGW 401 stores the device ID, the device authentication ID, the information conversion module, the common key (encryption key) and the HGW-ID into the storage section 902 correspondingly to the card ID. The HGW 901 sends these information, the common key (encryption key) uniquely generated in the HGW 901, and the HGW-ID to the card 401. The card 401 receives these information through the connection unit 403, the external device interface 108, and the setting unit 109, and sets them in the common key storage section 103, the device authentication ID storage section 105, the device ID storage section 106, the information conversion unit 107, and the HGW-ID storage section 112.

Hereinafter, an example will be described in which the card, in which the various information is set, is set in the control object device.

Figure 10:
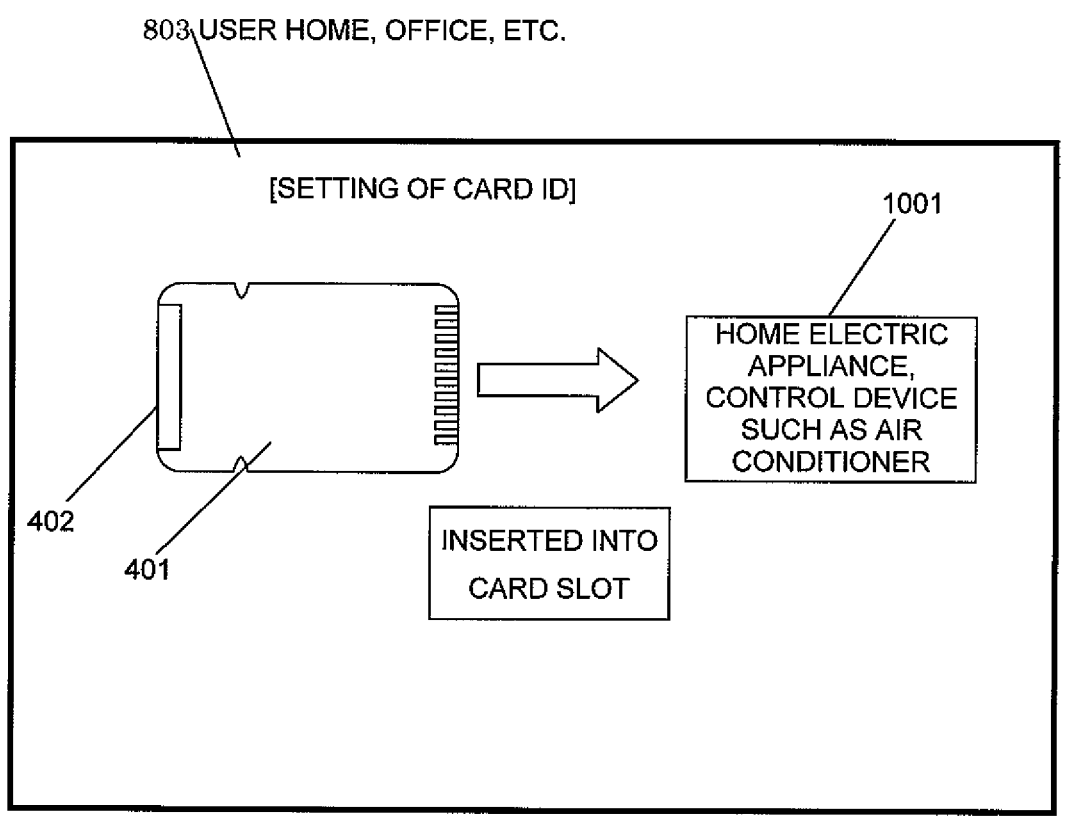
FIG. 10 is an explanatory view of setting (user home, office, etc.) of a card.

FIG. 10 is an explanatory view of setting (user home, office, etc.) of the card.

At the time point when the setting is completed, the card 401 is pulled out from the HGW 901, and the card 401 is connected to a card slot of a control object device 1001. One of the connected card 401 and the control object device 1001 becomes main, the device ID such as the manufacture number of the control object device 1001 on the card 401 is checked against the device ID of the control object device 1001 to which the card 401 is connected, and when they coincide with each other, the card 401 sends the device authentication ID of the device authentication ID storage section 105 to the encryption/decryption unit 102. The encryption/decryption unit 102 encrypts the sent device authentication ID based on the common key (encryption key) of the common key storage section 103, sends it to the HGW 901 by the communication unit 101 through the antenna section or fixed network connection section 402, and performs the device authentication. By the succession of these functions, it is certified that the control object device 1001 is the device which is authenticated by the manufacture maker or the certificate authority 805.

Figure 11:
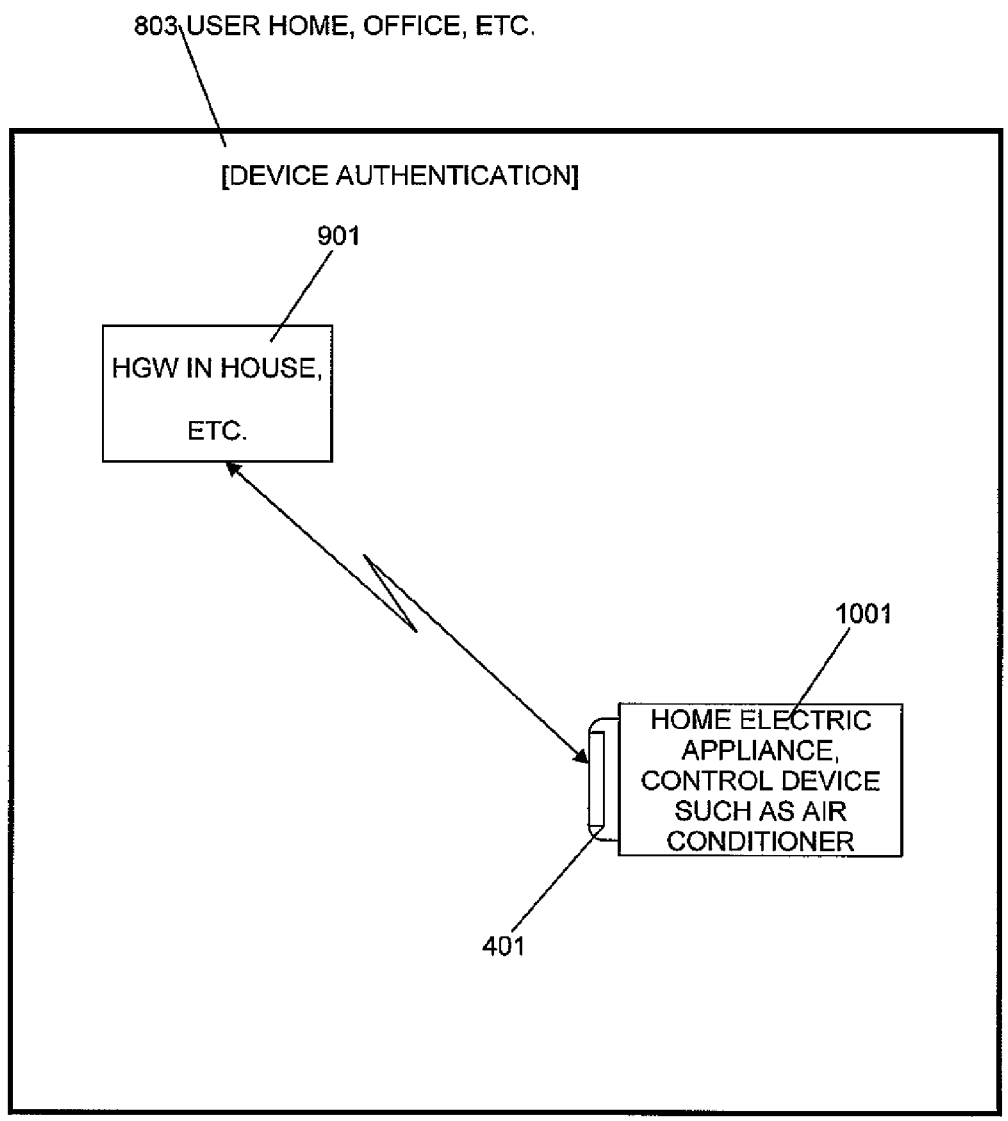
FIG. 11 is an explanatory view of authentication (user home, office, etc.) of a device.

FIG. 11 is an explanatory view of authentication (user home, office, etc.) of the device.

By using the HGW-ID stored in the HGW-ID storage section 112, a communication path is formed by the communication unit 101 and the encryption/decryption unit 102. The information conversion module such as each protocol conversion between the HGW 901 and the control object device 1001 is set in the information conversion unit 107, and the information sent by wireless from the HGW 901 side passes through the antenna section 402, and after the information is decrypted by the encryption/decryption unit 102, the information is sent to the information conversion unit 107. After the information conversion unit 107 performs conversion into the protocol of the control object device 1001, the information is sent to the control object device 1001 through the external device interface 108 and the connection unit 103. The information from the control object device 1001 side is subjected to a flow opposite to this flow and is transmitted to the HGW 901.

In this way, by the card 401, the encryption/decryption process is performed by the encryption/decryption unit 102, and the information conversion process such as the protocol conversion is performed by the information conversion unit 107, and the HGW 901 or an apparatus connected to the HGW 901 can perform remote control, maintenance or monitor of the control object device 1001.

3. Details of the Operation (Sequence and Flowchart)

Figure 12:
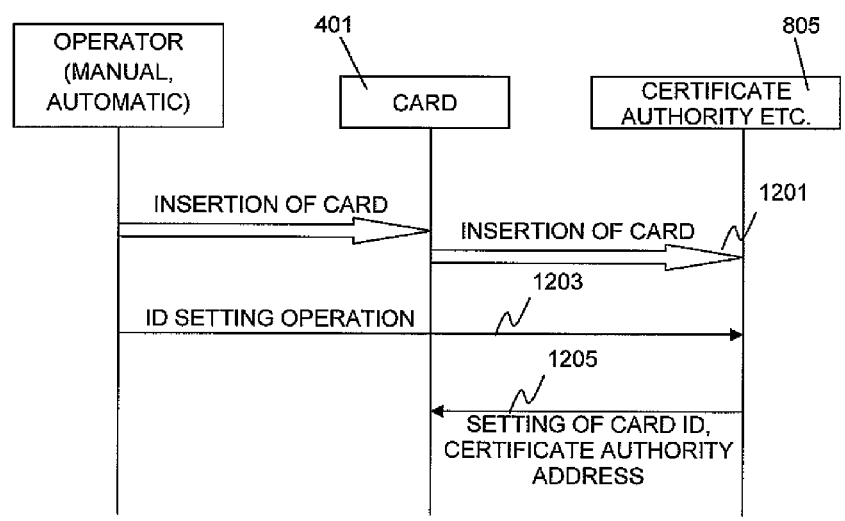
FIG. 12 is a setting Sequence view (certificate authority, manufacture maker, etc.) of a card ID.

FIG. 12 is a sequence view showing a setting example of a card in a certificate authority.

Here, for example, in a certificate authority server (HGW, etc.) 801, it is assumed that various information, such as personal information (personal home GW information, etc.), device information, information conversion module, device authentication ID, device ID and manufacture maker, which are connected to the card ID are stored in a storage section 802 connected thereto.

When the card 401 in which information is not set is inserted in the certificate authority server 801 (1201), the certificate authority server 801 detects that the card 401 is inserted, and automatically or manually sets the card ID and the address of the certificate authority 805 into the card 401 (1203, 1205).

Figure 15:
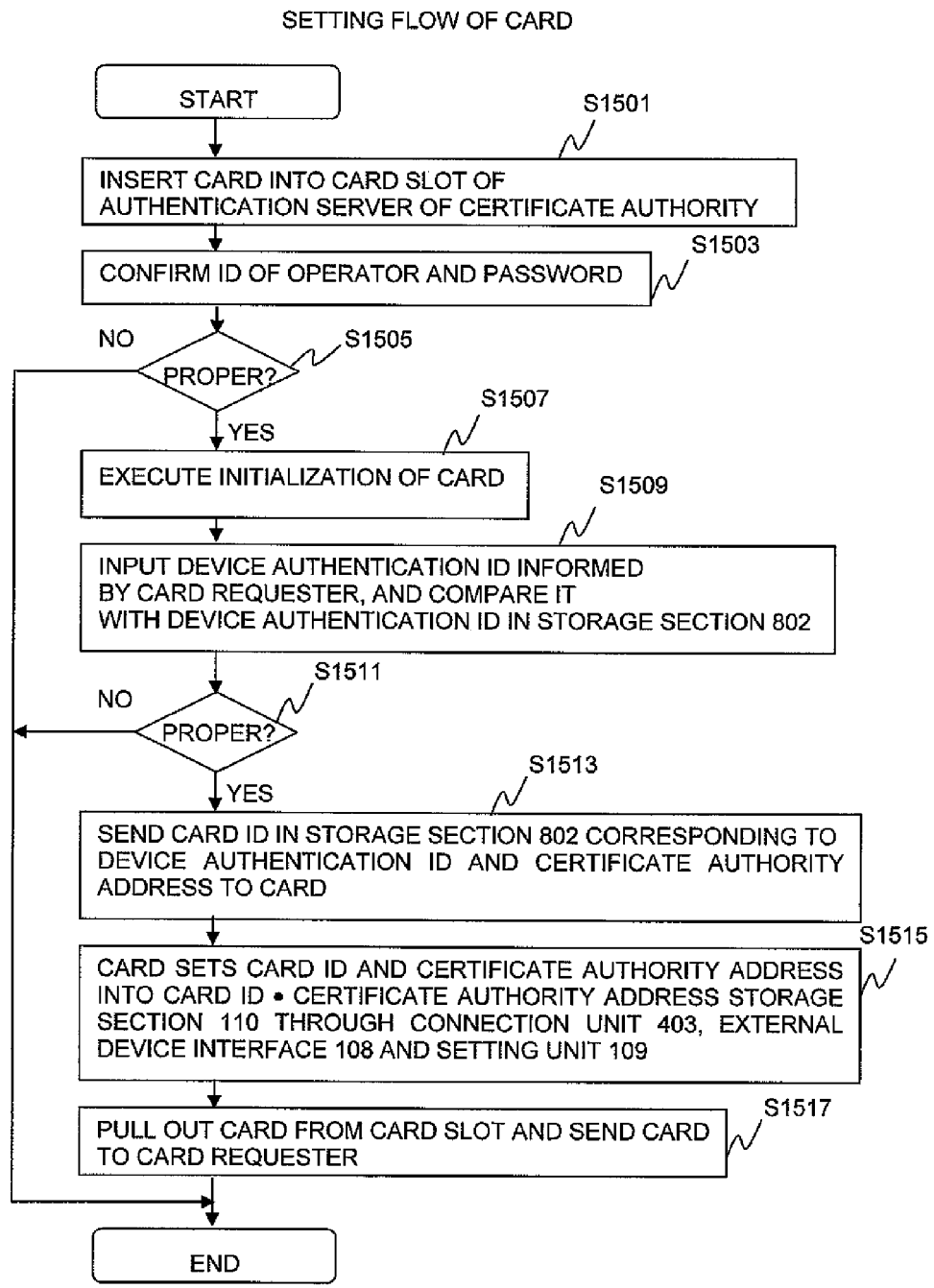
FIG. 15 is a setting flowchart of a card ID.

FIG. 15 is a flowchart showing a card ID and certificate authority address setting process in the certificate authority.

First, in the certificate authority, an operator inserts the card 401 into the card slot of the server 801 (S1501).

The authentication of the operator is performed between the certificate authority server 801 and the operator (S1503). For example, the certificate authority server 801 confirms the ID and password of the operator based on the information previously registered in the storage section 802 or the like.

When the confirmation result is improper (S1505: NO), the certificate authority server 801 ends the process. On the other hand, when the confirmation result is proper (S1505: YES), the certificate authority server 801 initializes the card 401 and initializes various setting information on the card 401 (S1507).

A device authentication ID informed by the card requester is inputted, and based on the device authentication ID, the certificate authority server 801 searches a device authentication ID previously stored in the storage section 802 of the certificate authority server 801 (S1509). When the search result is improper (the device authentication ID is not registered) (S1511: NO), the certificate authority server 801 ends the process.

On the other hand, when the search result is proper (the device authentication ID is already registered) (S1511: YES), the certificate authority server 801 sends, to the card 401, the card ID and the certificate authority address corresponding to the device authentication ID previously registered in the certificate authority 805 (S1513). Incidentally, here, as the card ID, data previously stored in the storage section 802 and corresponding to the device authentication ID may be used, or the card ID may be issued by the certificate authority server 801 based on a previously determined procedure and may be stored in the storage section 802 correspondingly to the device authentication ID. The card 401 sets the received card ID and the certificate authority address into the card ID ● certificate authority address storage section 110 through the connection unit 403, the external device interface 108 and the setting unit 109 (S1515).

The card 401 is pulled out from the slot and is sent to the card requester (S1517).

Figure 13:
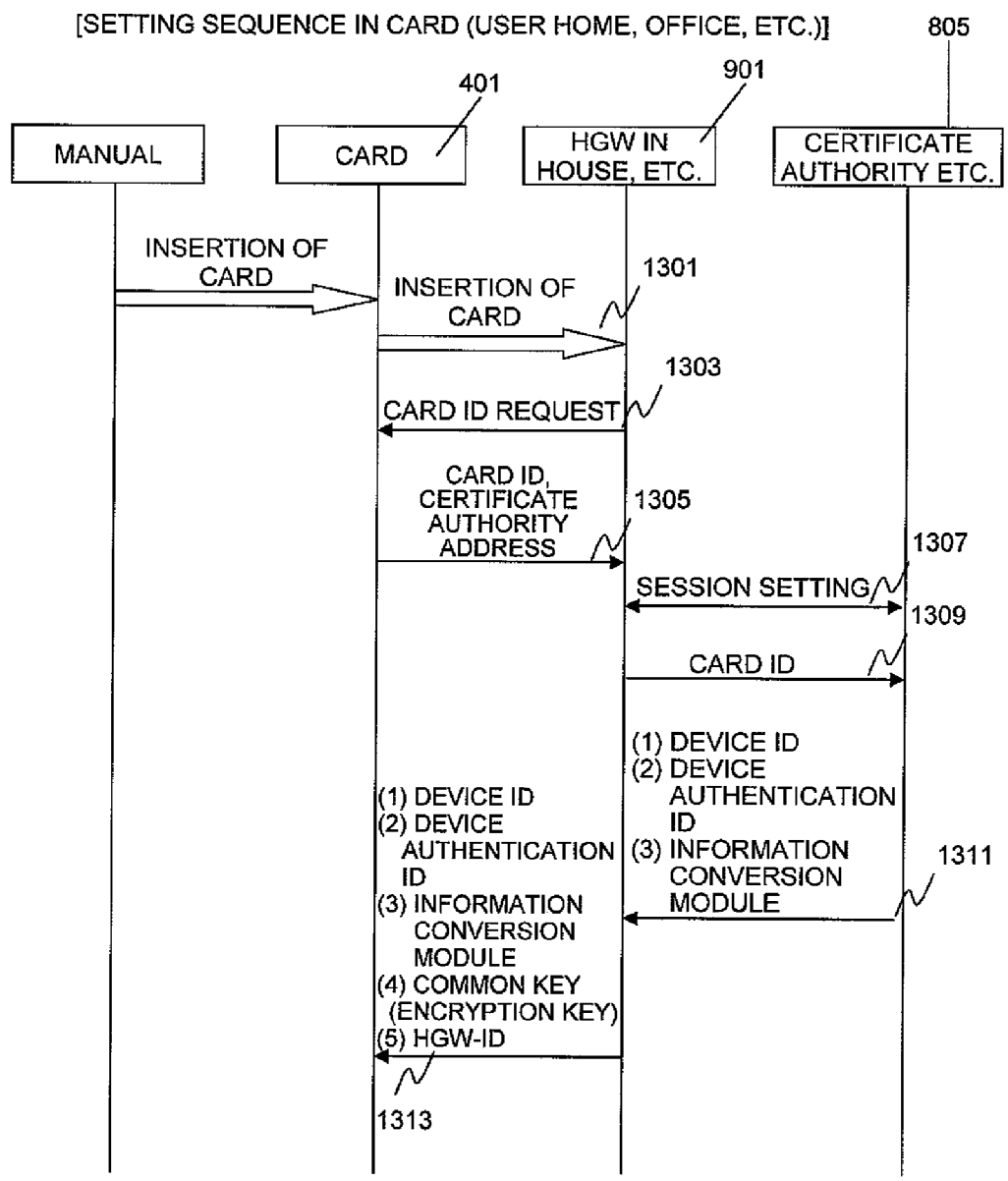
FIG. 13 is a setting sequence view (user home, office, etc.) in a card.

FIG. 13 is a sequence view showing an example in which various information are set in the card, which is sent from the certificate authority or the like and in which the card ID is already set, by the HGW installed in the user home, factory or office.

When the user or the like inserts the sent card 401 into the HGW 901 (1301), the HGW 901 recognizes that the card 401 is inserted, and requests the card ID and the certificate authority address from the card 401 (1303). The card 401 transmits the card ID and the certificate authority address set in the card ID ● certificate authority address storage section 110 to the HGW 901 (1305). The HGW 901 performs session setting to the certificate authority 805 based on the received certificate authority address (1307), and transmits the card ID to the certificate authority 805 (S1309).

The certificate authority 805 searches the storage section 802 based on the card ID, obtains the respective information such as information conversion module, device authentication ID and device ID, and sends them to the HGW 901. The HGW 901 receives (downloads) the respective information, and stores them in the storage section 902 (1311). The HGW 901 generates the common key (encryption key) to be set for the card ID, stores it in the storage section 902 correspondingly to the card ID, and sets, together with the generated common key (encryption key) and the HGW-ID, the information such as the device ID, the device authentication ID and the information conversion module, which are received from the certificate authority 805, into the card 401 (1313). Here, for example, the device ID, the device authentication ID, the information conversion module, the common key (encryption key) and the HGW-ID are stored in the storage section 902 connected to the HGW 901 correspondingly to the card ID.

Figure 16:
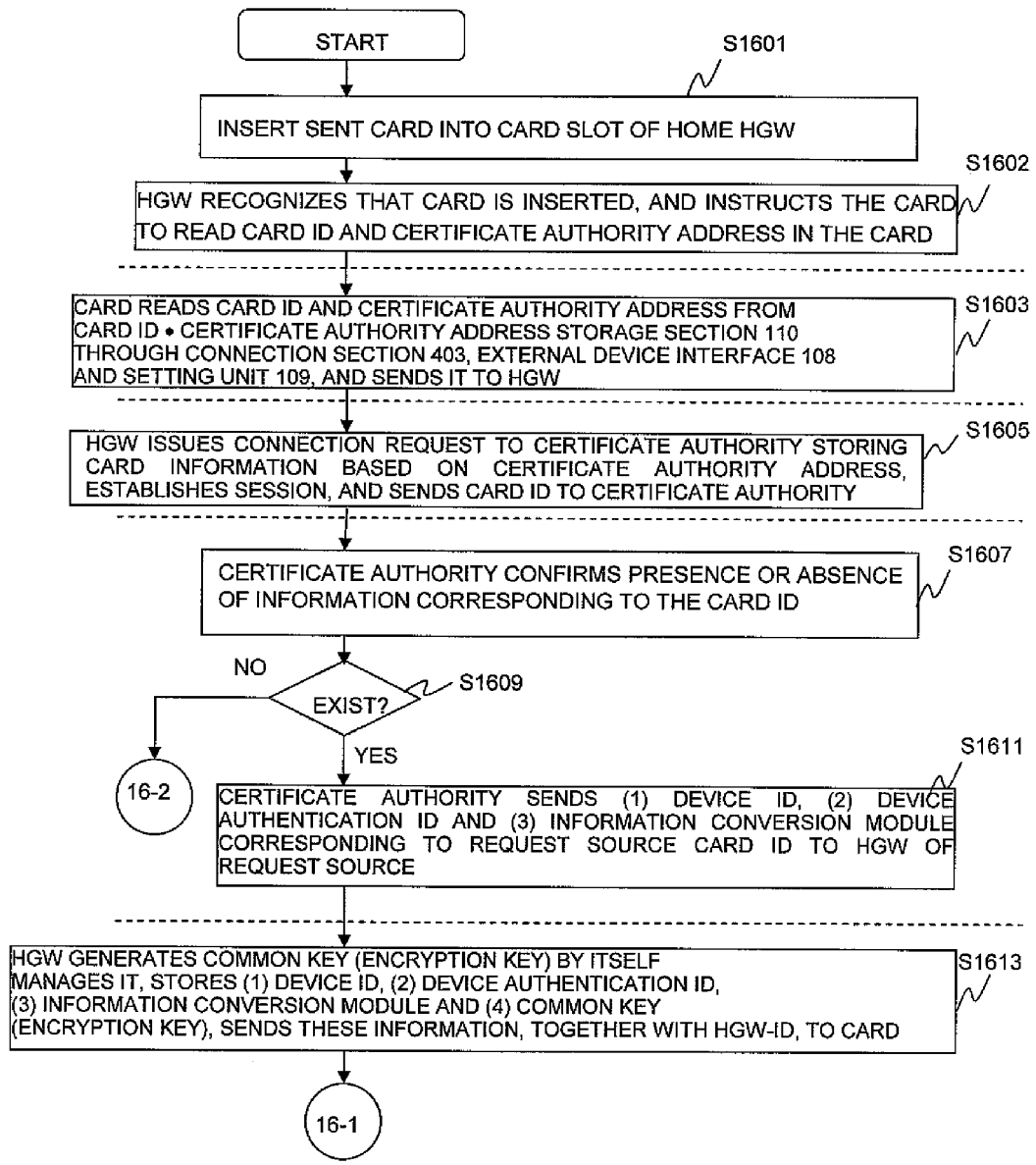
FIG. 16 is a setting flowchart (1) of a card.
Figure 17:
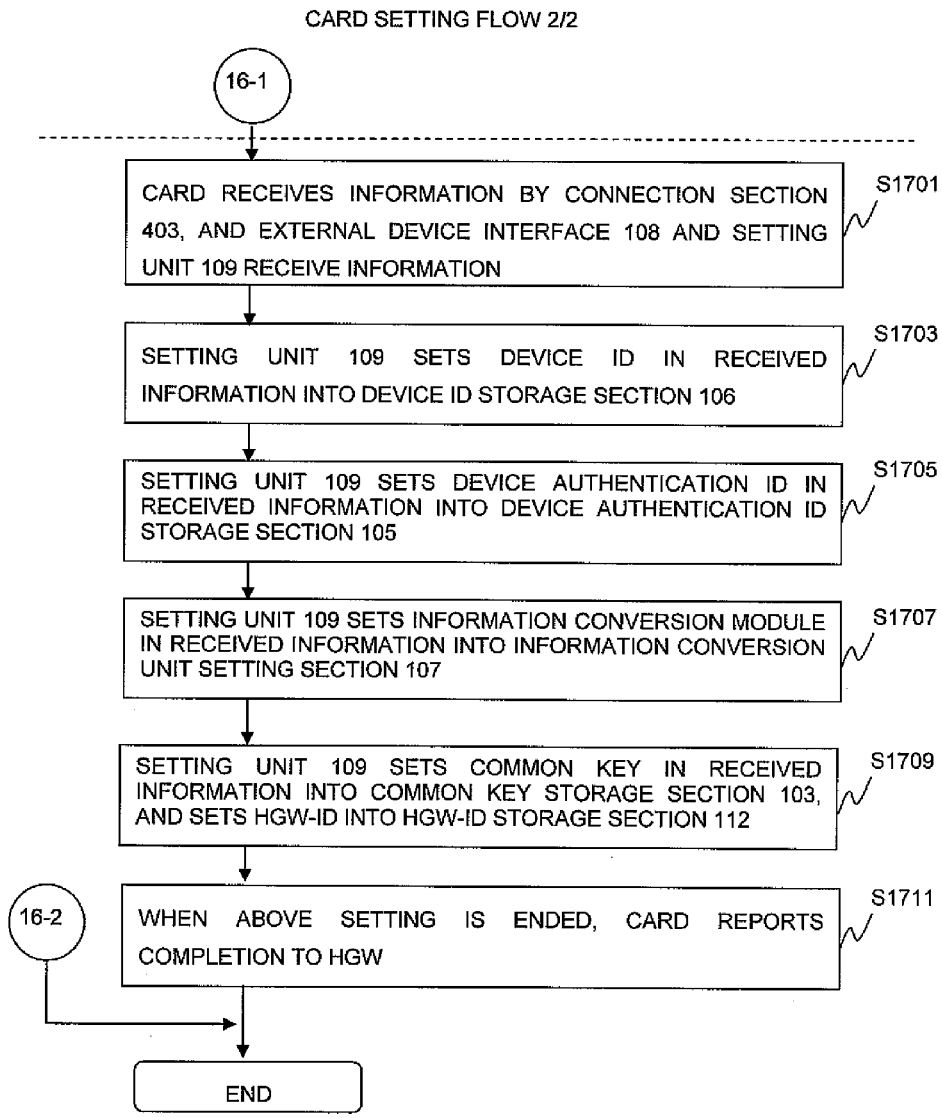
FIG. 17 is a setting flowchart (2) of the card.

FIG. 16 and FIG. 17 show card setting process flowcharts in a user home.

The card 401 sent to the user home 803 is inserted into a card slot of the HGW 901 of the home (S1601). The HGW 901 recognizes that the card 401 is inserted, and makes a request to read the card ID and the certificate authority address which are set in the card 401 by the certificate authority 805 (S1602). In accordance with the instruction from the HGW 901, the card 401 delivers the information to the HGW 109 from the card ID ● certificate authority address storage section 110 through the connection unit 103, the external device interface section 108, and the setting unit 109 (S1603).

In accordance with the certificate authority address, the HGW 901 establishes session to the certificate authority server 801, and sends the card ID to the certificate authority server 801 (S1605).

The certificate authority server 801 searches the storage section 802, and confirms the presence or absence of the information corresponding to the received card ID (S1607). When the card IS exist in the storage section 802 (S1609: YES), the certificate authority server 801 sends the device ID, the device authentication ID and the information conversion module, which are stored correspondingly to the card ID, to the HGW 901 of the request source by using the session (S1611). On the other hand, when the card ID information does not exist (S1609: NO), the certificate authority server 801 ends the process.

The HGW 901 generates the unique common key (encryption key) for the card 401 by itself, and sends the key, together with the HGW-ID and the sent device ID, the device authentication ID and the information conversion module, to the card 401 (S1613). At this time, in the card 401, the information is sent to the setting unit 109 through the connection unit 103 and the external device interface section 108 (S1701), the device ID is set in the device ID storage section 106 (S1703), and the device authentication ID is set in the device authentication ID storage section 105 (S1705). Besides, the information conversion module is set in the information conversion unit 107 (S1707), the common key (encryption key) is set in the common key storage section 103, and the HGW-ID is set in the HGW-ID storage section 112 (S1709). Then, the card 401 reports the completion to the HGW 901 (S1711).

Figure 14:
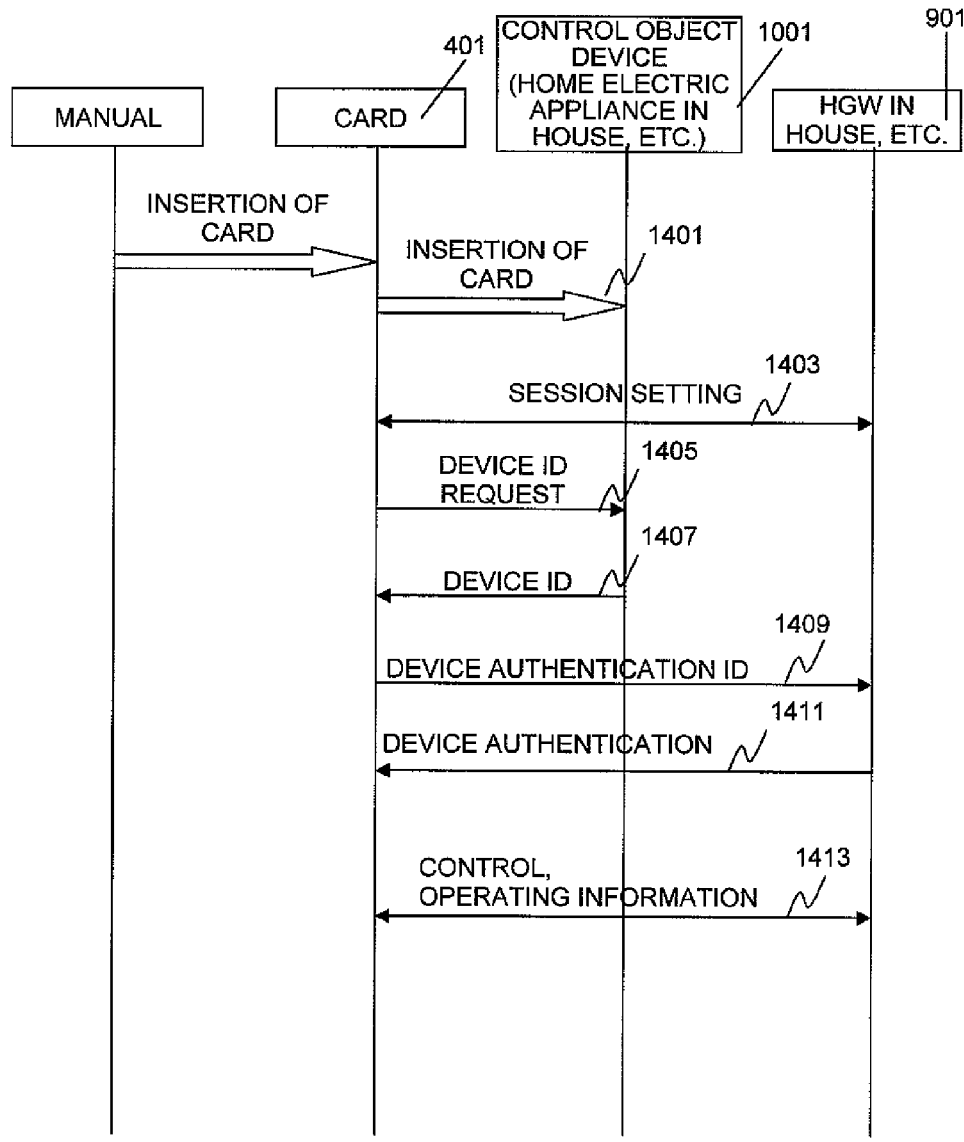
FIG. 14 is a device authentication sequence view (user home, office, etc.).

FIG. 14 is a sequence view showing an example in which a card, in which various information are set, is set in a control object device.

When the user or the like inserts the card 401, in which the setting in the HGW 901 is ended, into the control object device 1001 such as an air conditioner (1401), the card 401 establishes session to the HGW 901 through the communication unit 101 and the antenna section or fixed network connection section 402 based on the HGW-ID stored in the HGW-ID storage section 112 (1403). Then, comparison with the device ID, such as the manufacture number or device type name, is performed between the card 401 and the control object device 1001. Specifically, the card 401 first requests transmission of the device ID from the control object device 1001 (1405), and acquires the device ID from the control object device 1001 (1407).

The card 40 compares the device ID sent from the control object device 1001 with the device ID set in the device ID storage section 106 of the card 401. When the device IDs coincide with each other, the card transmits data including the device authentication ID of the device authentication ID storage section 105 and the card ID to the HGW 901 by the communication unit 101 (1409), and completes the device authentication (1411). For example, the HGW 901 receives the card ID and the device authentication ID from the card 401, and searches the storage section 902 based on the card ID to obtain the device authentication ID, and when the device authentication ID coincides with the received device authentication ID, it can be determined that the authentication can be established. At this time, the device authentication ID is converted by the information conversion unit 107 when necessary, and/or is encoded by the encryption/decryption unit 102, and is transmitted by the communication unit 101 through the antenna section or fixed network connection section 402.

After this, the card 401 and the HGW 901 transmit and receive operating information, control information and setting information via the established session (1413).

In this way, in the card 401, the encryption/decryption process is performed by the encryption/decryption unit 102, and the information conversion process such as the protocol conversion is performed by the information conversion unit 107, and the HGW 901 or the apparatus connected to the HGW 901 can perform remote control, maintenance or monitor of the control object device 1001.

4. Details of the Respective Units

Figure 2:
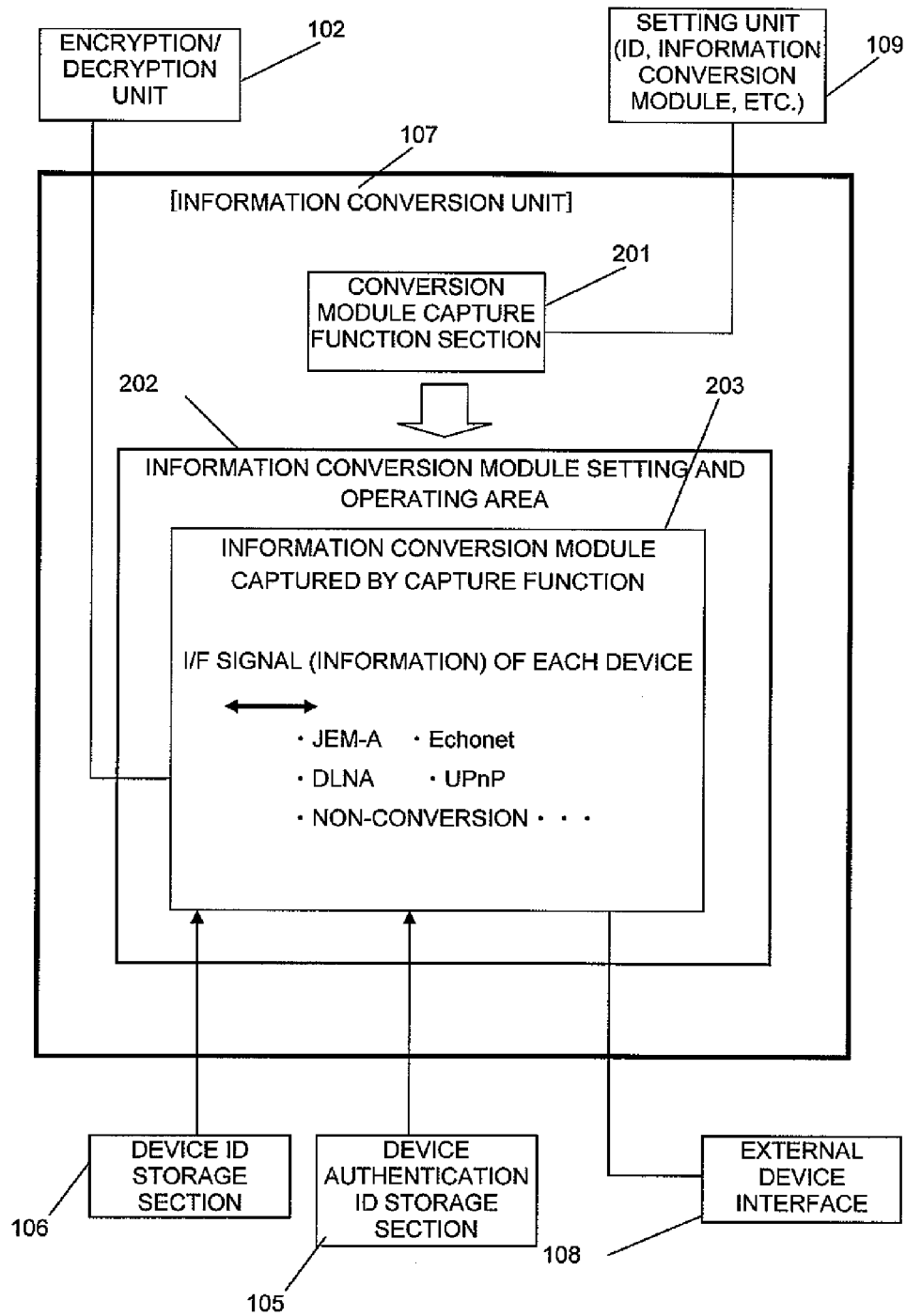
FIG. 2 is a structural view of an information conversion unit.

FIG. 2 is a structural view of the information conversion unit.

The information conversion unit 107 includes, for example, a conversion module capture function section 201, and an information conversion module setting and operating area 202.

The information conversion unit 107 performs setting of the conversion module 203 sent from the setting unit 109, and the protocol conversion of various information between the control object device 1001 and the HGW 901 side device. The conversion module capture function section 201 has a function to receive the module for protocol conversion sent from the setting unit 109 and to set it in the information conversion module setting and operating area 202. The information conversion module setting and operating area 202 is an area portion for setting and operating the information conversion module 203 to perform the protocol conversion.

The information conversion module 203 is a module to convert the information between the encryption/decryption unit 102 and the external device interface 108 into an interface coincident with each of them. As the content, the information conversion module converts an electric signal of the control object device 1001 into each protocol of JEM-A, Echonet, Universal Plug and Play (UPnP), Digital Living Network Alliance (DLNA), information home electric alliance of specific specification, or remote maintenance and control, and mediates the information between the HGW 901 and the control object device 1001. Besides, at the time of session establishment, the device ID sent from the control object device 1001 and the device ID set in the device ID storage section of the card 401 are compared with each other, and the control object device 1001 is authenticated. The device authentication ID of the device authentication ID storage section 105 is sent to the HGW 901, and the device authentication between the control object device 1001 and the card 401 is performed.

Figure 3:
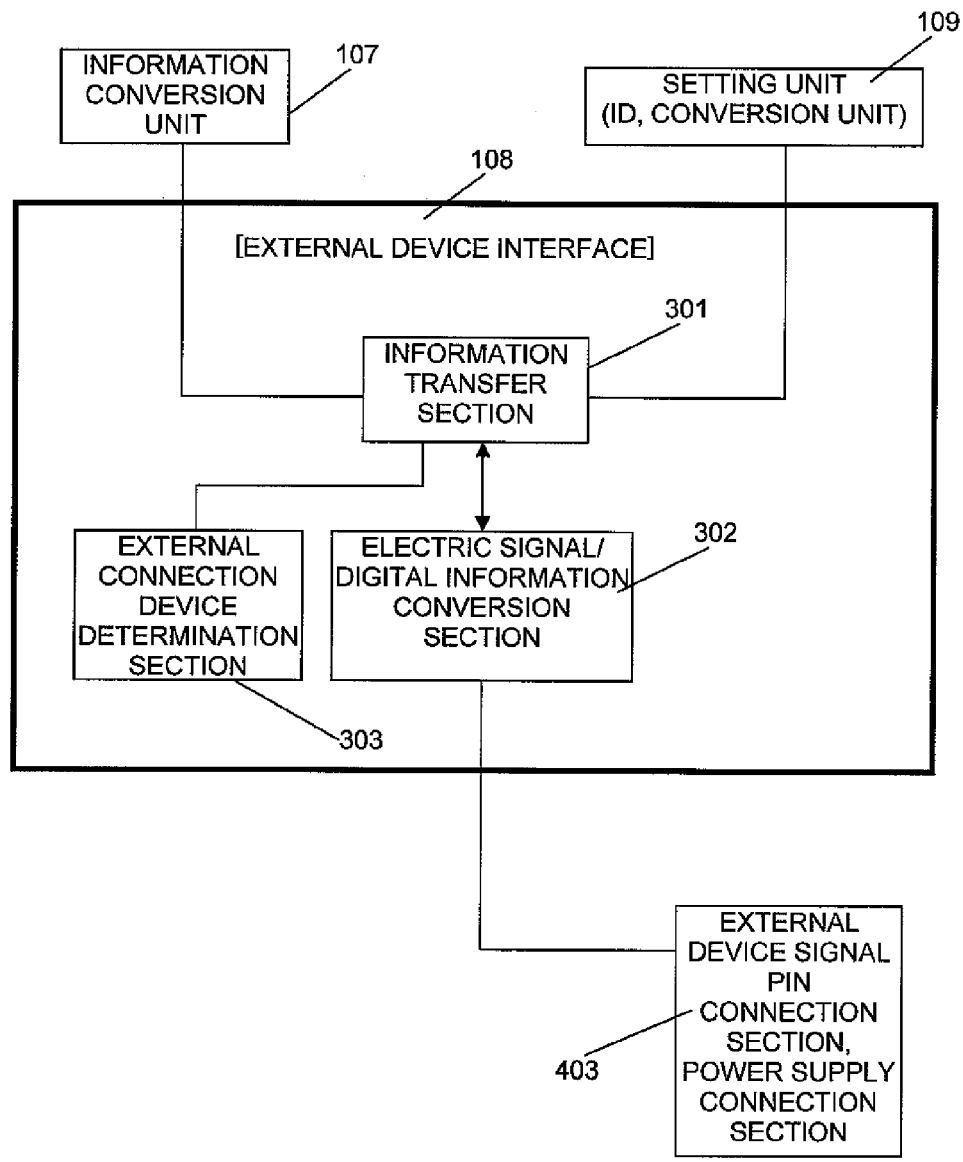
FIG. 3 is a structural view of an external device interface.

FIG. 3 is a structural view of the interface to an external apparatus.

The external device interface 108 includes, for example, an information transfer section 301, an electric signal/digital information conversion section 302, and an external connection device determination section 303.

The external device interface 108 mediates information between the information conversion unit 107 or the setting unit 109 and the connection unit 103. When the card 401 is connected to the certificate authority server 801 or the HGW 901, the external connection device determination section 303 detects this. The electric signal/digital information conversion section 302 receives the electric signal sent from the connection unit 103, converts it into digital information, and sends it to the setting unit 109 through the information transfer section 301. When the card 401 is connected to the control object device 1001, the external connection device determination section 303 determines this. The electric signal/digital information conversion section 302 receives the electric signal sent from the connection unit 103, converts it into digital information, and sends it to the information conversion unit 107 through the information transfer section 301. On the other hand, the information sent from the information conversion unit 107 is received by the electric signal/digital information conversion section 302 through the information transfer section 301, is converted into an electric signal, and is sent to the connection unit 103.

Figure 4:
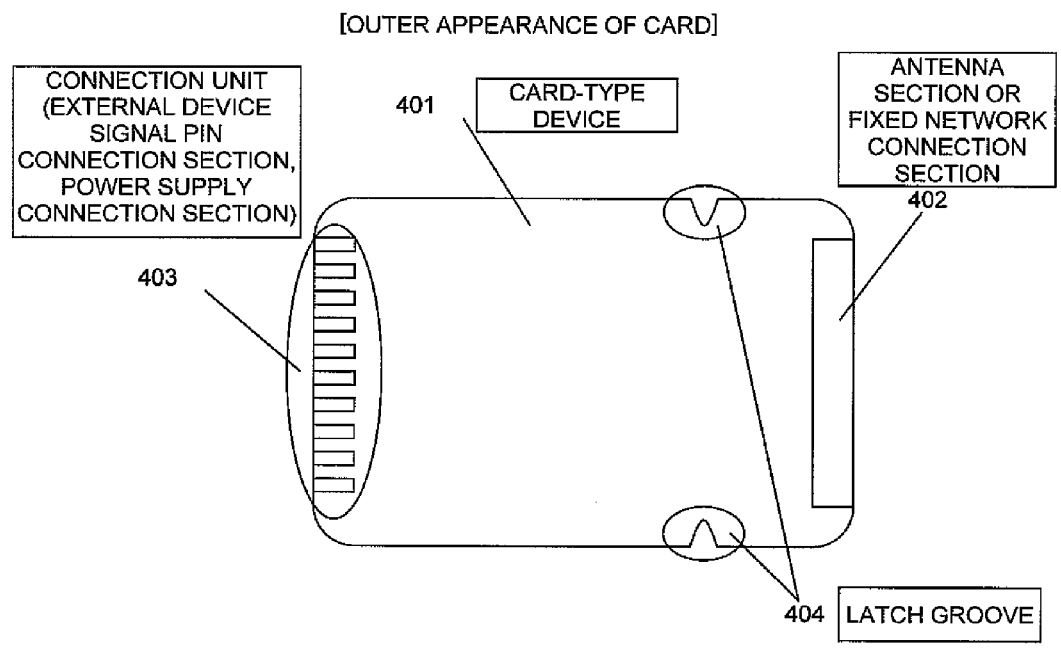
FIG. 4 is a view showing an outer appearance of a card.

FIG. 4 is an explanatory view showing the outer appearance of the card.

The illustrated card-type device (card main body) 401 shows the whole of the card main body, and the antenna section or fixed network connection section 402 is a portion to connect with the HGW 901 by wireless or wired. The connection unit 403 is an external device signal pin and is a portion to transmit and receive an electric signal to and from the certificate authority server 801, the HGW 901 and the control object device 1001. A latch groove 404 is a portion to be latched to a device in order to prevent the card 401 from being shifting by vibration of the object device such as the control object device 1001.

Figure 5:
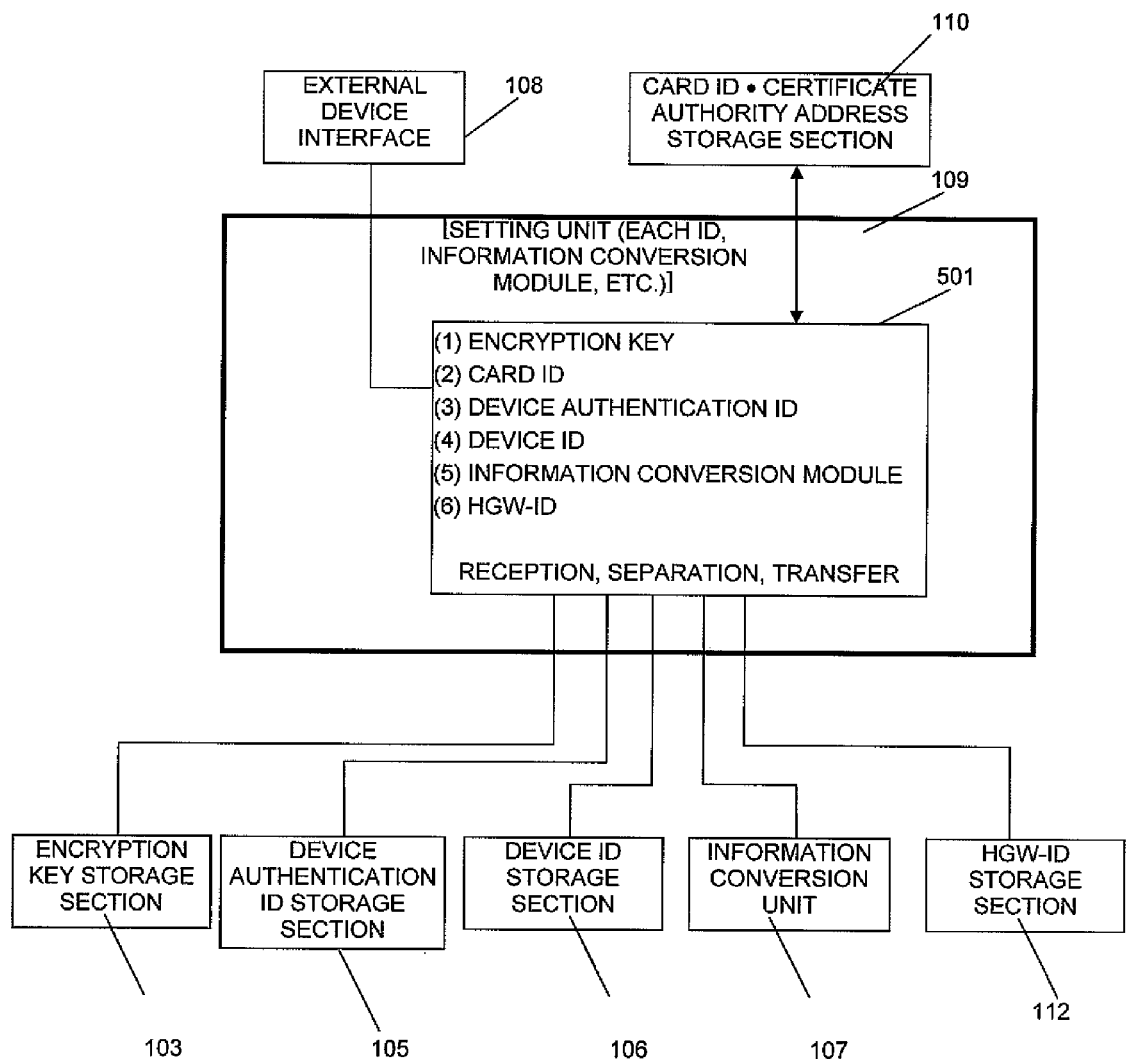
FIG. 5 is a structural view of a setting unit.

FIG. 5 is a structural view of the setting unit (ID, conversion unit).

The setting unit 109 includes, for example, a setting section 501. When the main body card 401 is inserted in the certificate authority server 801 or the HGW 901 and information is sent from the information setting device interface 108, the setting section 501 performs a specified operation in accordance with the kind of the information. Incidentally, the operation content is as follows.

(1) The common key (encryption key) is set in the common key (encryption key) storage section 103.

(2) The card ID is set in the card ID ● certificate authority address storage section 110.

(3) The device authentication ID is set in the device authentication ID storage section 105.

(4) The device ID is set in the device ID storage section 106.

(5) The information conversion module is set in the information conversion unit 107.

Figure 6:
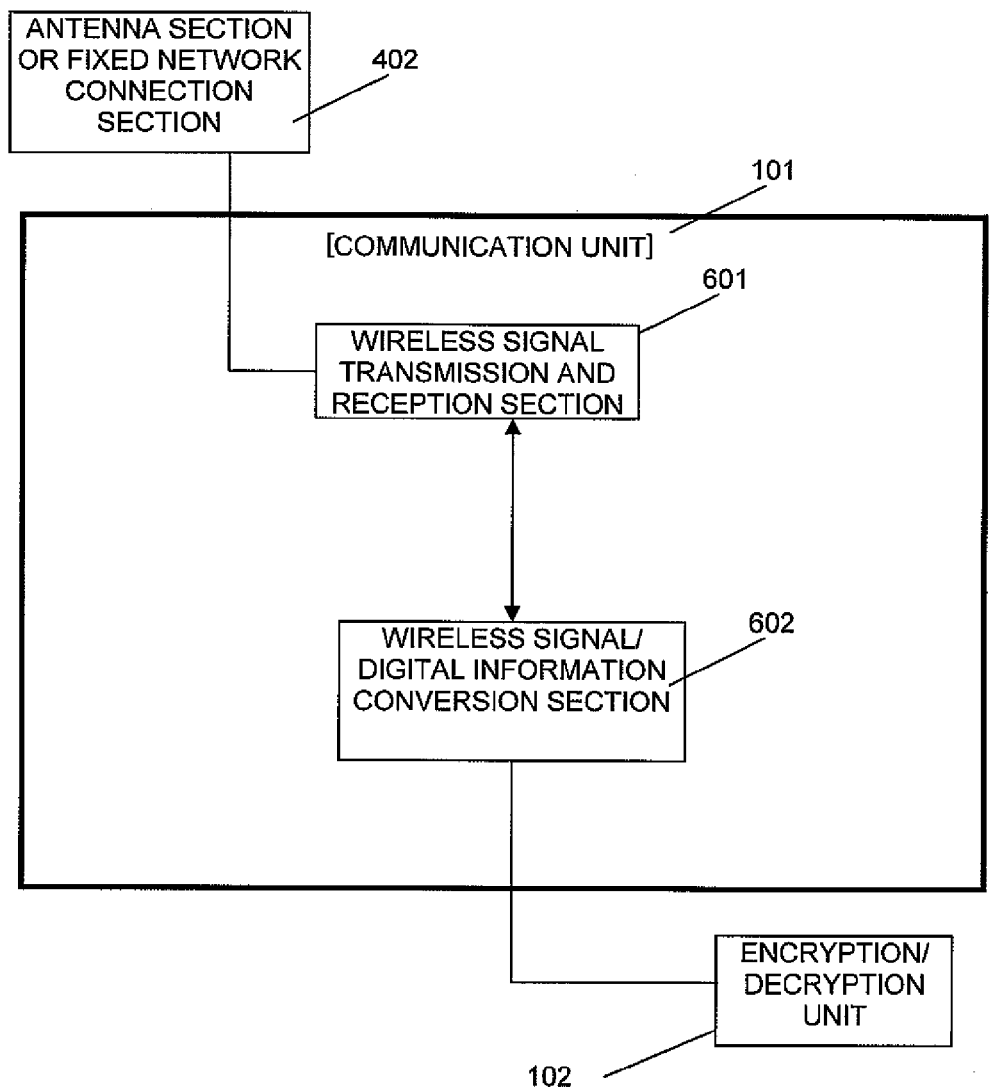
FIG. 6 is a structural view of a communication unit.

FIG. 6 is a structural view of the communication unit.

The communication unit 101 includes, for example, a wireless signal transmission and reception section 601 and a wireless signal/digital information conversion section 602.

The communication unit 101 mediates information between the antenna section or fixed network connection section 402 and the encryption/decryption unit 102.

The communication unit 101 receives the information of the HGW 901 side, which is received through an external network, by the wireless signal transmission and reception section 601. The information is converted into a digital signal by the wireless signal/digital information conversion section 602, and then is sent to the encryption/decryption unit 102.

Besides, the communication unit 101 converts the information sent from the encryption/decryption unit 102 into a wireless signal by the wireless signal/digital information conversion section 602, and then receives it by the wireless signal transmission reception section 601, and sends it to the antenna section or fixed network connection section 402.

Incidentally, when connection to a wired network is performed, a signal for network is used instead of the wireless signal, and the structure is replaced by an appropriate one, for example, the wireless signal transmission and reception section 601 is replaced by a network signal transmission and reception section, and the wireless signal/digital information conversion section 602 is replaced by a network signal/digital information conversion section.

Figure 7:
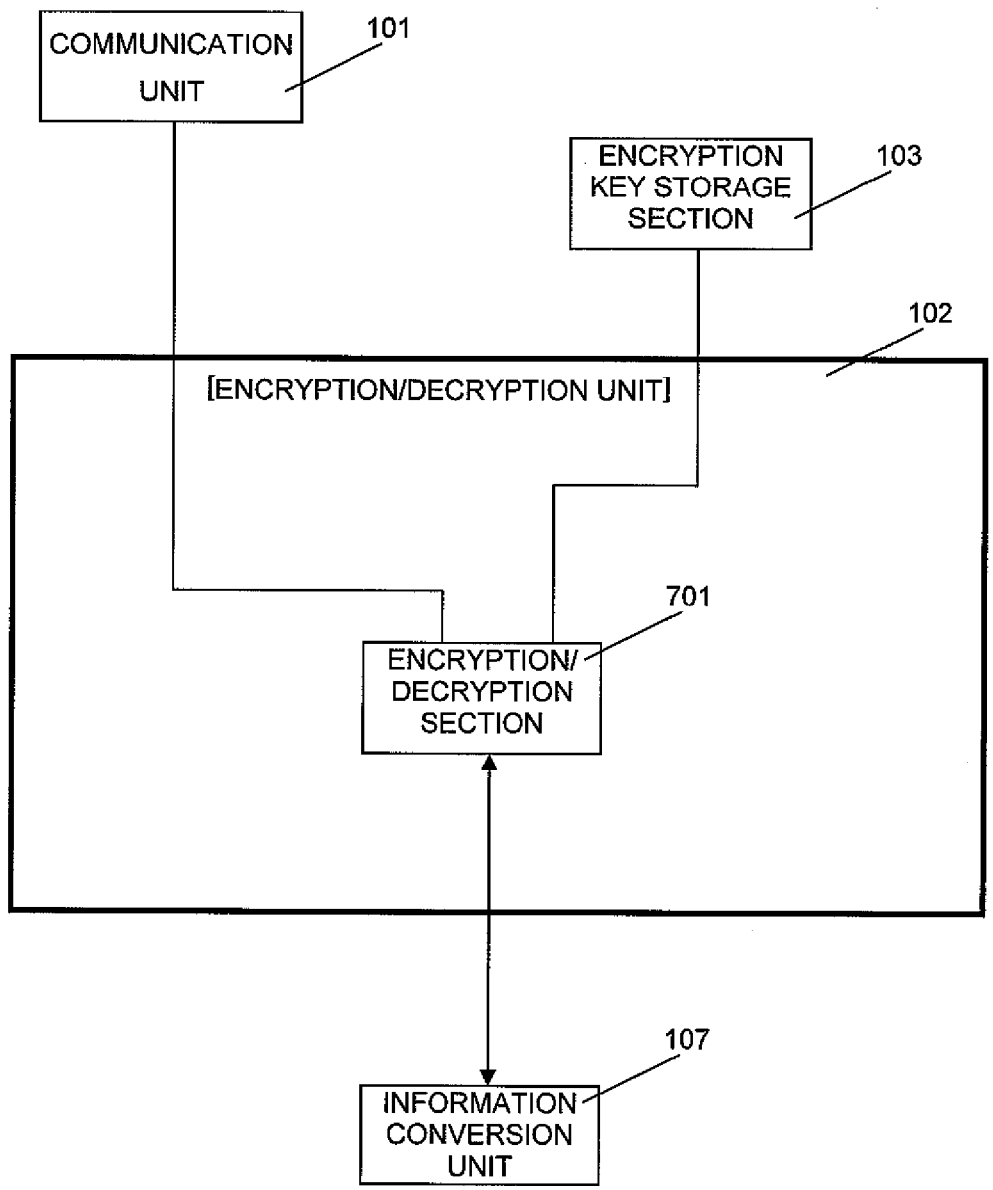
FIG. 7 is a structural view of an encryption/decryption unit.

FIG. 7 is a structural view of the encryption/decryption unit.

The encryption/decryption unit 102 includes, for example, an encryption/decryption section 701.

When information is sent to the network side (HGW 901 side), the encryption/decryption section 701 encrypts the information sent from the information conversion unit 107 based on the common key (encryption key) of the encryption key storage section 103 and sends it to the communication unit 101.

When information is sent from the network side HGW 901, the encryption/decryption section 701 decrypts it based on the common key (encryption key) of the encryption key storage section 103, and sends it to the information conversion unit 107.

In general, an information home electric appliance or a device to which remote maintenance, setting or control is performed does not rapidly become popular, and a communication function or a remote control function is provided when necessary. Accordingly, when the remote maintenance, control or monitor function is added to all devices, the device cost is increased, and it is hard to support this function. When communication is performed by the card of the invention, an original control object device has only to support the information transmission and reception by an electric signal and the electric power supply portion, and the remote maintenance control or remote monitor function can be supported by obtaining the card when necessary and by inserting it into the control object device. Besides, also when different signals are used for respective control object devices, when the information conversion module such as the protocol conversion software is set in the information conversion unit from the outside, the information conversion module such as the protocol conversion software for each control object device can be freely set. In the case where the remote maintenance control or remote monitor is not used, the device is used as it is, so that the cost for the useless authentication, encryption and communication function can be suppressed.

What is claimed is:

1. A communication device system in which a card-type device is inserted into or connected to a control object device, the card-type device and a gateway are connected by a wireless or wired network, device authentication of the control object device is performed, and a maintenance control or remote monitor apparatus connected to the gateway performs remote maintenance control or remote monitor of the control object device,
wherein
the card-type device comprises:
a connection section to be connected to a card slot of the control object device or another device by a pin or a contact;
a communication section to connect with the wireless or wired network;
a card storage section to store a previously determined card ID, a previously determined certificate authority address, a device authentication ID, a device ID and a gateway ID;
an information conversion section to perform protocol conversion or another conversion process between a signal used in the control object device and remote maintenance control information or remote monitor information used in the maintenance control or remote monitor apparatus connected to the gateway in accordance with a set information conversion module; and
an encryption/decryption section which encrypts information from the information conversion section based on an encryption key stored in the card storage section, and sends it by the communication section, and while, which decrypts information from the communication section based on the encryption key, and sends it to the information conversion section,
wherein
the card-type device stores the card ID and the certificate authority address in the card storage section,
the card-type device stores the device authentication ID, the device ID and the encryption key in the card storage section by the gateway, and sets the information conversion module in the information conversion section by the gateway,
when the card-type device is inserted into or connected to the control object device through the connection section, the card-type device establishes session to the gateway through the network by the communication section in accordance with the gateway ID stored in the card storage section,
the card-type device acquires a device ID from the control object device through the connection section,
the card-type device compares the device ID acquired from the control object device through the connection section with the device ID stored in the card storage section,
when both the device IDs coincide with each other, the card-type device encrypts the device authentication ID stored in the card storage section by the encryption/decryption section in accordance with the encryption key, transmits it to the gateway through the network by the communication section, and executes device authentication by the gateway,
after the gateway completes the device authentication,
(1) the card-type device performs the protocol conversion or another conversion process between the electric signal of the control object device and the information of the gateway side device for information electric home appliance or for remote maintenance control or for remote monitor by the information conversion section in accordance with the information conversion module, and
(2) i) the card-type device decrypts the information sent from the gateway based on the encryption key stored in the card storage section by the encryption/decryption section and sends it to the information conversion section, and/or
ii) the card-type device encrypts the information sent from the information conversion section based on the encryption key stored in the card storage section, sends it to the gateway through the network by the communication section, and
(3) the card-type device performs the remote maintenance control or remote monitor between the gateway and the control object device.

2. The communication device system according to claim 1, wherein, when the card-type device is inserted into or connected to a card slot of a certificate authority, after authentication to the certificate authority is confirmed, the card-type device receives the card ID and the certificate authority address through the connection section, and sets the card ID and the certificate authority address in the card storage section.

3. The communication device system according to claim 1, further comprising a certificate authority including:
a certificate authority storage section to store an information conversion module, a device authentication ID and a device ID correspondingly to the card ID;
a certificate authority card slot for connection to the card-type device,
wherein,
when the card-type device is inserted into the card slot of the certificate authority, and an ID and a password of an operator are inputted, the certificate authority confirms the inputted ID and the password of the operator,
when a confirmation result is proper, the certificate authority initializes the card-type device,
when a device authentication ID is inputted, the certificate authority searches the device authentication ID previously stored in the certificate authority storage section based on the device authentication ID,
when the device authentication ID is already registered, the certificate authority searches the certificate authority storage section, obtains the card ID corresponding to the previously registered device authentication ID and the certificate authority address, and sends them to the card-type device through the certificate authority card slot, and the card-type device receives the card ID and the certificate authority address through the connection section and sets them in the card storage section.

4. The communication device system according to claim 1, wherein the card-type device receives a device ID, a device authentication ID, an encryption key, an information conversion module, and a gateway ID from the gateway through the connection section, sets the device ID, the device authentication ID, the encryption key, and the gateway ID into the card storage section, and sets the information conversion module into the information conversion section.

5. The communication device system according to claim 1 further comprising a certificate authority including a certificate authority storage section to store an information conversion module, a device authentication ID and a device ID correspondingly to the card ID, wherein,
the gateway includes:
a gateway storage section to store an information conversion module, a device authentication ID, a device ID and an encryption key correspondingly to the card ID; and
a gateway card slot for connection to the connection section of the card-type device,
wherein,
the card-type device in which the card ID and the certificate authority address are previously set by the certificate authority is inserted into the gateway card slot of the gateway,
the gateway recognizes that the card-type device is inserted, and reads the card ID and the certificate authority address from the card storage section through the gateway card slot,
the gateway establishes session to the certificate authority in accordance with the certificate authority address,
the gateway sends the card ID to the certificate authority,
the certificate authority searches the certificate authority storage section, and sends the device ID, the device authentication ID and the information conversion module stored correspondingly to the card ID to the gateway by using the session,
the gateway stores the information conversion module, the device authentication ID, the device ID, and the encryption key into the gateway storage section correspondingly to the card ID,
the gateway generates a unique encryption key for the card-type device, and sends it, together with the gateway ID, and the sent device ID, the device authentication ID, and the information conversion module, to the card-type device through the gateway card slot,
the card-type device receives the device ID, the device authentication ID, the encryption key, the information conversion module, and the gateway ID from the gateway through the connection section, sets the device ID, the device authentication ID, the encryption key and the gateway ID into the card storage section, and sets the information conversion module into the information conversion section.

6. The communication device system according to claim 1, the gateway including a gateway storage section to store an information conversion module, a device authentication ID, a device ID and an encryption key correspondingly to the card ID, wherein,
when the card-type device transmits the device authentication ID stored in the card storage section to the gateway by the communication section through the network, the gateway searches the device authentication ID stored in the gateway storage section correspondingly to the card ID, and when it coincides with the received device authentication ID, device authentication is confirmed.

7. The communication device system according to claim 1, wherein the card-type device converts the device authentication ID by the information conversion module of the information conversion section, and transmits the device authentication ID to the gateway by the communication section.

8. A card-type device in a communication device system in which a card-type device is inserted into or connected to a control object device, the card-type device and a gateway are connected by a wireless or wired network, device authentication of the control object device is performed, and a maintenance control or remote monitor apparatus connected to the gateway performs remote maintenance control or remote monitor of the control object device, the card-type device comprising:

a connection section to be connected to a card slot of the control object device or another device by a pin or a contact;
a communication section to connect with the wireless or wired network;
a card storage section to store a previously determined card ID, a previously determined certificate authority address, a device authentication ID, a device ID and a gateway ID;
an information conversion section to perform protocol conversion or another conversion process between a signal used in the control object device and remote maintenance control information or remote monitor information used in the maintenance control or remote monitor apparatus connected to the gateway in accordance with a set information conversion module; and
an encryption/decryption section which encrypts information from the information conversion section based on an encryption key stored in the card storage section, and sends it by the communication section, and while, which decrypts information from the communication section based on the encryption key, and sends it to the information conversion section,
wherein
the card-type device stores the card ID and the certificate authority address in the card storage section, stores the device authentication ID, the device ID and the encryption key in the card storage section by the gateway, and sets the information conversion module in the information conversion section by the gateway,
when the card-type device is inserted into or connected to the control object device through the connection section, the card-type device establishes session to the gateway through the network by the communication section in accordance with the gateway ID stored in the card storage section,
the card-type device acquires a device ID from the control object device through the connection section,
the card-type device compares the device ID acquired from the control object device through the connection section with the device ID stored in the card storage section,
when both the device IDs coincide with each other, the card-type device encrypts the device authentication ID stored in the card storage section by the encryption/ decryption section in accordance with the encryption key, transmits it to the gateway through the network by the communication section, and executes device authentication by the gateway, after the gateway completes the device authentication, (1) the card-type device performs the protocol conversion or another conversion process between the electric signal of the control object device and the information of the gateway side device for information electric home appliance or for remote maintenance control or for remote monitor by the information conversion section in accordance with the information conversion module, and (2) i) the card-type device decrypts the information sent from the gateway based on the encryption key stored in the card storage section by the encryption/decryption section and sends it to the information conversion section, and/or ii) the card-type device encrypts the information sent from the information conversion section based on the encryption key stored in the card storage section, sends it to the gateway through the network by the communication section, and (3) the card-type device performs the remote maintenance control or remote monitor between the gateway and the control object device.

9. The card-type device according to claim 8, wherein, when the card-type device is inserted into or connected to a card slot of a certificate authority, after authentication to the certificate authority is confirmed, the card-type device receives the card ID and the certificate authority address through the connection section, and sets the card ID and the certificate authority address in the card storage section.

10. The card-type device according to claim 8, wherein the card-type device receives a device ID, a device authentication ID, an encryption key, an information conversion module, and a gateway ID from the gateway through the connection section, sets the device ID, the device authentication ID, the encryption key, and the gateway ID into the card storage section, and sets the information conversion module into the information conversion section.

* * * * *